US009596358B2

(12) United States Patent
Chiu et al.

(10) Patent No.: US 9,596,358 B2
(45) Date of Patent: Mar. 14, 2017

(54) SYSTEM AND METHOD FOR CORPORATE MOBILE SUBSCRIPTION MANAGEMENT

(71) Applicant: Oncept, Inc., Palo Alto, CA (US)

(72) Inventors: Samuel Shin Wai Chiu, Stanford, CA (US); Venkat Narayan Putrevu Ramdass, Santa Clara, CA (US); Jean Pascal Crametz, Mountain View, CA (US)

(73) Assignee: ONCEPT, INC, Palo Alto, CA (US)

( * ) Notice: Subject to any disclaimer, the term of this patent is extended or adjusted under 35 U.S.C. 154(b) by 215 days.

(21) Appl. No.: 13/866,861

(22) Filed: Apr. 19, 2013

(65) Prior Publication Data

US 2014/0087688 A1    Mar. 27, 2014

Related U.S. Application Data

(60) Provisional application No. 61/704,046, filed on Sep. 21, 2012.

(51) Int. Cl.
*H04M 15/00* (2006.01)
*H04M 11/00* (2006.01)
*H04W 4/24* (2009.01)

(52) U.S. Cl.
CPC .......... *H04M 15/59* (2013.01); *H04M 15/43* (2013.01); *H04M 15/44* (2013.01); *H04M 15/70* (2013.01); *H04M 15/72* (2013.01); *H04M 15/765* (2013.01); *H04M 15/7652* (2013.01); *H04M 15/80* (2013.01); *H04M 15/8038* (2013.01); *H04W 4/24* (2013.01)

(58) Field of Classification Search
CPC ......... H04W 4/24; H04W 4/26; H04W 12/08; H04M 15/00; H04M 15/43; H04M 15/08; H04M 15/80
USPC ............ 379/114.01, 114.03, 121.02, 121.04; 455/405–408
See application file for complete search history.

(56) References Cited

U.S. PATENT DOCUMENTS

| | | |
|---|---|---|
| 6,574,465 B2 | 6/2003 | Marsh et al. |
| 6,618,355 B1 * | 9/2003 | Gulliford et al. ............. 370/230 |
| 6,681,106 B2 | 1/2004 | Marsh et al. |
| 7,072,639 B2 | 7/2006 | Marsh et al. . |

(Continued)

*Primary Examiner* — Quoc D Tran (57) ABSTRACT

This invention relates generally to a system and method to provide mobile subscription service management for medium and large corporations, allowing continuing back-end total cost optimization. It determines a minutes pool collectively shared by a group of users, with an equitable cost allocation scheme which assures individual cost saving relative to the least cost stand-alone plan. The system provides real-time active mobile devices usage alert management, expense monitoring, report generation, individual internal cost center based billing and hierarchical data access through a web-based portal. The system is built on a Uniform Database, pulling information from Monthly Statements, Call Detail Records (CDRs), invoices, plan features and data usage summaries across diverse vendor platforms. The system covers all mobile communication devices, including but not limited to all smart phones (Blackberries, Androids, Windows and i-Phones herein), encompassing various protocols (CDMA, GSM or dual mode) and transmission media (WiFi and cellular network).

17 Claims, 10 Drawing Sheets

Dual View of Carrier Invoice and Individual Invoice (56) References Cited

U.S. PATENT DOCUMENTS 7,664,484 B2 2/2010 Marsh et al
8,582,739 B1 * 11/2013 Gonzales et al. .......... 379/114.2

* cited by examiner

Figure 1. Overview of Invention

Figure 2. Dual View of Carrier Invoice and Individual Invoice

Figure 3. Initial Usage Statistics Module

Figure 4.    Historical Usage Statistics Module

Figure 5.    Usage Questionnaire Estimation Module

Figure 6.    Usage Statistics Update Module

Figure 7.    Plan Parameter Descriptor Module

Figure 8. Plan Cost Evaluation Module

Figure 9. Right-Sizing Module

Figure 10. Pooled Plan Cost Evaluation Module

Figure 11.  Pooled Usage Pattern Evaluation Module

Figure 12.  Pooled Plans Aggregation Module

Figure 13.  Pooled Plan Evaluation Module

Figure 14. Pooled Plan Optimization Module

Figure 15. Chargeback Module

Figure 16. Per Peak Minute Cost Statistics Update Module

Figure 17. Pooled Plan Re-Optimization Module

Figure 18. Alert System Module Architecture

Figure 19. Alert System Registration

Figure 20. HSC Status Communication to CPS

Figure 21. Communications Logic between HSC and CPS

Figure 22. HSC/CPS Communications Events Classification

Figure 23. Group Synchronization

Figure 24.   Web-based Portal Hierarchical Query Access

SYSTEM AND METHOD FOR CORPORATE MOBILE SUBSCRIPTION MANAGEMENT

TECHNICAL FIELD

This invention relates generally to corporate mobile device service subscription management, particularly to a system and method to provide cost minimization of subscription plans based on users sharing a common pool of resources (voice minutes and/or data usage), equitable and incentive compatible common cost allocation and distribution, reports generation individualized billing and web-based portal access and active real-time usage alert; for medium and large corporate clients. The term cellular phones will be used to generically represent mobile communication devices, which include but are not limited to cellular phones and smart phones (Blackberries, Androids, Window and i-Phones herein), and it also encompasses various protocols (CDMA, GSM or dual mode) and transmission media (e.g., WiFi and cellular network).

BACKGROUND OF INVENTION

Cellular (mobile) voice/data expense is a monthly recurring cost item. As one embodiment of the invention, we will use voice minutes usage in our description herein with the straightforward extension being applied, but not limited to data usage.

It is often difficult for a corporate user to subscribe to an optimal plan, one that will minimize the long term annual expense. A cellular voice subscription plan is generally characterized by the following parameters: a fixed MRC (monthly recurring cost); a monthly minute allowance above which a per-minute charge will apply—the higher the MRC, the larger is the minute allowance. For example, a hypothetical plan may provide 1,000 monthly minutes for a fixed MRC of $79.99, above which a user is billed at $0.25 per minute. If a user should consume less than the monthly minute allowance, the user pays $79.99 for the month.

Since a user does not know in advance her/his exact usage, a small plan (small monthly minute allowance and low MRC) may result in expensive overage charges. On the other hand, a plan too large will result in wasted unused minutes. Usage fluctuation makes ad hoc subscription plan selection non-optimal. Any intelligent subscription optimization has to take into account not just a user's average monthly minute usage, but also its fluctuation. As input parameter to "optimal" plan selection, prior arts use moving average to represent usage profile with ad hoc adjustment to buffer month-to-month usage fluctuation. The lack of an appropriate objective function makes existing methods sub-optimal.

The existence of usage sharing (corporate equivalent of a family plan), in which a group of users collectively share a pool of voice minutes, makes the modeling and evaluation of an appropriate objective (cost) function all the more critical—to take into account the collective usage fluctuation (the sum of minutes consumed by users in a group) in determining the optimal size of the shared minute pool.

In a shared pool (minutes) environment, the total pool cost has to be shared amongst the pool users. It is critical to establish a cost allocation/distribution scheme which is fair and incentive compatible (a single user is cost-wise better off to join to pool other than subscribing to a best available plan).

To develop a cost allocation rule, it is important to establish a baseline cost as a benchmark for each individual user: what is the least cost a user can enjoy on his/her own.

Price benchmarking can also be used to realize savings through negotiations and/or competitive bidding, particularly for a corporation with international presence.

In addition to cellular voice service plan provisioning, individual user has his/her own specific mobility needs: roaming charges (particularly international) and data usage (domestic and international).

Cellular voice charge is based on air time. Corporate sponsored toll free conference bridges (e.g., 800 or 888 calls) incur additional expenses if a local alternative is not used even when available. Instant real-time information to provide low(er) cost alternatives is desirable to utilize the availability of corporate toll free conference bridges—to minimize overall expenses.

Directory assistance calls are expensive when a no-cost alternative (e.g., 800-GOOGLE-411) is neither used nor made aware.

It is desirable to alert a user with a limited data plan, in real time, his/her data usage to provide awareness of usage approaching its monthly limit.

U.S. wireless carriers allow pooling as an added feature for a fee: users in a pool share a common pool of minute allowance for a fixed monthly fee. A per minute charge is levied when the users in a pool collectively exhausted the monthly minute allowance.

Local and state taxes/fees in the U.S. can vary widely with percentage rate ranging between low teens to low twenties. Judicial billing location optimization subject to legal constraints can result in lower cellular expenses.

Non uniform reporting formats/schemes in carriers' CDR (Call Detail Record) make it difficult to have a common view of usages/expenses across different vendors.

Timely user and management access to billing information is essential to provide on-going costs/usages monitoring, feature auditing and report generations.

Therefore there is a need for a comprehensive expense monitoring/optimization system to manage a corporation's corporate liable cellular device accounts without imposing unwarranted hardship and hindrance on the users in productivity enhancement.

Such a system includes at least the following elements: international plan/cost benchmarking and plan choice negotiation, cost minimization of cellular voice expenses to take advantage of a shared pool of minutes, equitable chargeback of pooling expenses to appropriate corporate cost centers, optimal individual user feature subscription (e.g., roaming, international dialing, etc.), uniform database architecture to provide a common platform for diverse reporting formats/schemes by carriers, timely access to relevant and hierarchical access-controlled information by individuals and managers, reporting systems to monitor usages and expenses, active real time alert to users providing low cost alternatives as well as non-intrusive and non-work-obstruction behavioral modification.

SUMMARY OF THE INVENTION

Figure 1:
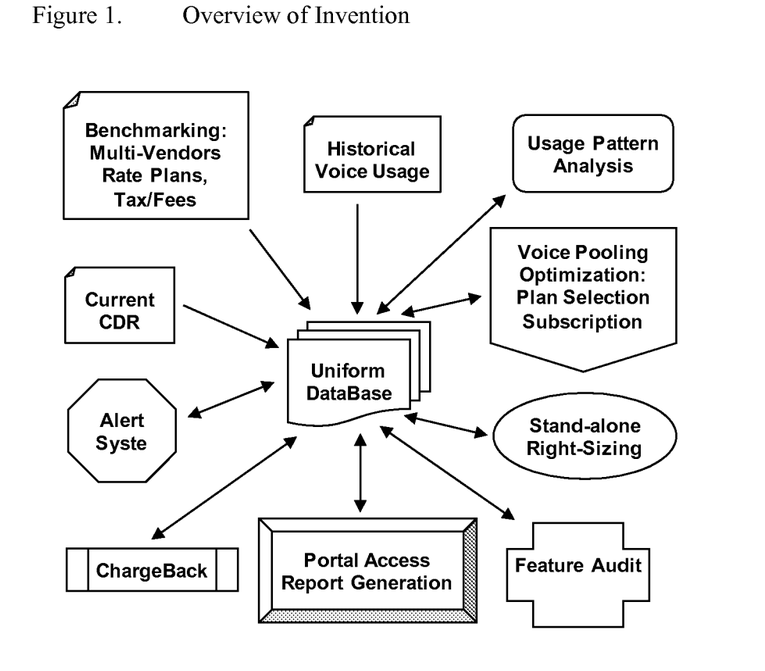
FIG. 1 illustrates an architectural overview of the integrated Mobile Devices Management System in accordance with at least one aspect of the present invention.
Figure 2:
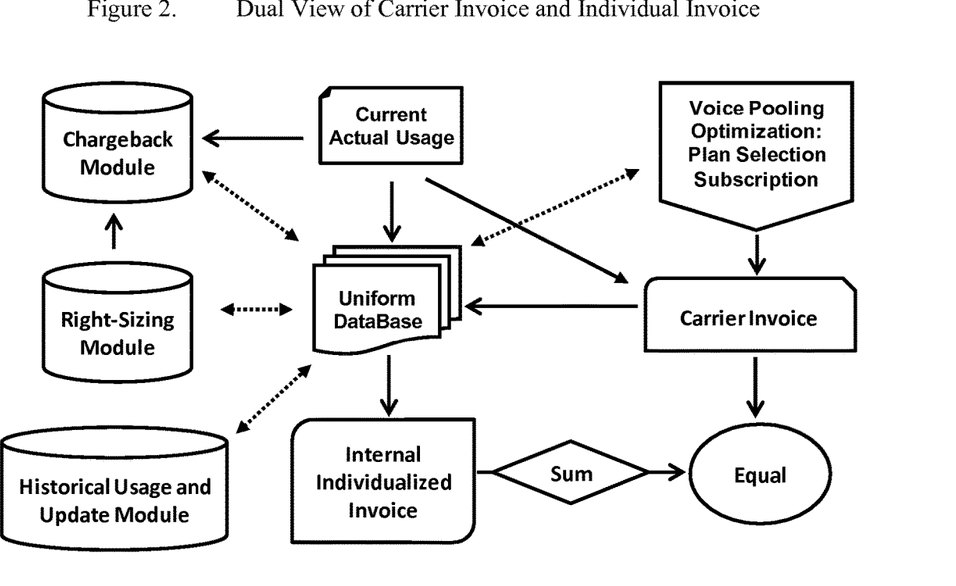
FIG. 2 illustrates the Dual View of Carrier Invoice and Individual Invoice in which the total monthly cost billed by the carrier (based on actual usage and the optimal shared pool subscription plans) is completed distributed and billed to individual user based on their best stand-alone subscription (if not joining the pool) using an equitable and incentive compatible chargeback mechanism. Note in FIG. 2 that the carrier's invoice for total shared pool spend equals the sum of all internal individualized invoices to all users after the chargeback function.

In accordance with at least one aspect of the present invention a system is described for providing an integrated expense management system for cellular communications for both voice and data. FIG. 1 shows the various components of the system. The exact interactions of system component are described in the Detailed Description of the Preferred Embodiments Section.

FIG. 1 represents one embodiment of such a system which includes: domestic and international price/feature benchmarking with implications for state and local taxes/fees, usage pattern analysis, a uniform database to capture diverse CDR (Call Detail Record) formats/schemes from different vendors, pooling optimization and plan selection subscription, equitable chargeback scheme to corporate cost centers, feature audit, web-based hierarchically (permission) controlled portal access for current and historical usage/cost information with a report generation engine, a real-time active alert system to inform user of low cost alternatives as well as current usage information (before the next statement is prepared by the vendor, which usually has a two-month time lag).

In this particular embodiment, the Uniform Database Module acts as communication-central of the Management System—collecting, distributing and storing all relevant information.

The Uniform Database Module captures relevant information from each vendor's distinct monthly Call Detail Records and monthly Statements to create a uniform database architecture. In one embodiment of this uniform database structure, it also contains a user's current network ID and up-to-date cumulative voice/data usage to facilitate the Alert System Module.

In one embodiment to characterize individual user's usage pattern, a three point usage distribution is assessed, which contains the maximum, minimum and most likely monthly usage. In another embodiment, the average and standard deviation of monthly usage are estimated from historical data. These statistics will be used to evaluate the cost effective of an offered plan by taking into account not just the average (monthly) usage but also usage fluctuations, which is central to our invention.

The Voice Pooling Optimization Module inputs rate plan parameters and usage patterns of corporate users to determine the optimal plans subscription minimizing average usage cost for all users in a pool. An individual user's usage pattern is represented by a probability distribution function. In one embodiment of the usage pattern probability distribution, a normal distribution is used to compute the average monthly cost of each rate plan. In another embodiment, a triangular distribution is used to represent individual usage pattern as well as aggregated usage pattern of the pooled users. Yet another embodiment uses a Beta Distribution to model usage fluctuations. An optimization routine is established to decide on what available plans (and how many of each) will be subscribed to satisfy the minute usage of the shared pool. The total number of plans subscribed equal the total number of users in the pool.

The Right-Sizing Module computes the best plan for each individual user if he were to subscribe to a single plan by himself with no sharing of minute allowance—to establish a benchmark for each individual user. Output of the Right-Sizing Module represents the least cost option for each user to provide a baseline/benchmark to facilitate cost allocation to the corporation's cost centers, to be used in the Chargeback Module.

A core of this invention is the dual view and management function of monthly expenses: (a) invoice from the carrier reflecting the total charge to a group of users who collectively "consume" a shared pooled of minutes; (b) individualized invoice statement from the system to each user taking into account the baseline/benchmark established in the Right-Sizing Module (what a user would be paying if he/she subscribes to the best stand-alone plan) and the cost savings because of pooling. The process comprising:

(i) Voice Pooling Optimization (how many for each plan) to form a shared pool. The plan subscription is artificial since all plans (total cost and total pool minutes) are shared by all the users—no single user is identified to a plan even though it will be artificially assigned to a user from a carrier's perspective.

(ii) Monthly invoice from the vendor is a single total cost bill with information about each individual user's usage.

(iii) The total invoice cost will be allocated to each user based on their baseline/benchmark plan using an equitable and incentive compatible chargeback scheme.

(iv) Each user will receive an individualized invoice, which is their baseline benchmark plan cost (evaluated against their actual usage and the best right-sizing plan), minus a chargeback credit (v) The sum of all individual invoices equal the total cost invoiced by the carrier.

The Alert System Module provides real-time information to a user in the least intrusive manner to accomplish at least the following objectives.

The first objective of the Alert System Module is behavior modification when timely (real time) information is provided to modify user usage behavior/practice.

The second objective of the Alert System Module is to provide real time low cost alternatives to satisfy the same user needs with minimum intrusion to a user to carry out her/his corporate responsibility/function. One embodiment of low cost alternative is free directory assistance to replace costly 411 directory information calls. Another embodiment is to provide alternative conference bridge to corporate paid toll free number since identical air-time is incurred without having to pay for the toll free access (by the corporation).

A third objective of the Alert System Module is to alert user of roaming (particularly international roaming) voice and data charges in real time so that a user is aware of the cost.

A fourth objective of the Alert System Module is to keep periodic check (with frequency to be driven by system administrative parameters) of various functions, including but are not limited to: international/domestic calls, data and SMS usage tracking, number and minutes of voice calls made in a country for a continuous duration of stay.

Yet another objective of the Alert System Module is to provide location based information so that least cost location dependent alternatives are communicated to the user in real time.

One embodiment of the Alert System Module handset implementation is customized to Android, Blackberry, i-Phone and Windows smart phones.

One embodiment of the Alert System Module hardware centralization is to utilize cloud computing to provide reliability and security.

Another embodiment of the Alert System Module hardware is to install a managed central server to be connected to the Internet.

Another embodiment of the Alert System Module hardware is to house the system internally at a corporation's data center.

The Portal Access and Report Generation Module provides timely information to users and management in a well defined hierarchical access structure to guarantee information distribution to the system-defined intended entities.

BRIEF DESCRIPTION OF DRAWINGS

For the purposes of illustrating the various aspects of the invention, there are shown in the drawings forms that are presently preferred, it being understood, however, that the invention is not limited to the precise arrangements and instrumentalities shown.

FIG. 18 illustrates an Alert System Architecture in accordance with at least one aspect of the present invention, comprising:

(i) at least one H and Set Client (HSC), an example of which and not limited to a Blackberry device, or an Android, or an i-Phone, or a Window phone;

(ii) a computer program residing on a non-transitory computer readable medium connected to a Uniform Database and at least one Central Process Server (CPS), residing in one embodiment on the Internet Cloud (e.g., the Amazon Cloud), and in another embodiment operating as a managed server connected to the Internet.

DETAILED DESCRIPTION OF THE PREFERRED EMBODIMENTS

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

With reference to the drawings, there is shown in FIG. 1 in accordance with at least one embodiment of the Corporate Mobile Subscription Management System.

Figure 3:
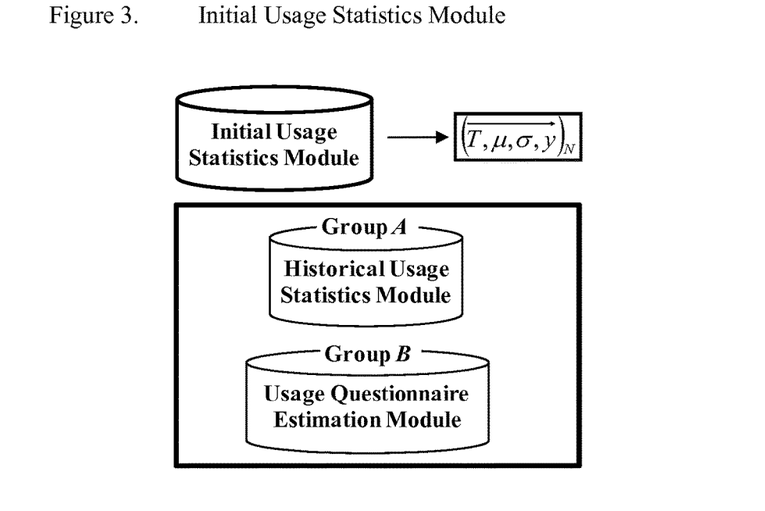
FIG. 3 illustrates an Initial Usage Statistics Module in accordance with at least one aspect of the present invention.

Historical voice usage for each user, if available, will be used to compute the mean and standard deviation of minute usage. In the preferred embodiment, there are two groups of users to be treated differently: there is sufficient historical usage data in one group to provide a usage profile which contains not just the average usage (time average) but also month-to-month usage fluctuations, in the case of insufficient historical data (e.g., new users), a questionnaire approach is used to model usage profile (both average and fluctuations). The output of this module is usage statistics for each user, which will be updated each month to incorporate new usage information. FIG. 3 shows a representation of one particular embodiment of this module. For each user i, a vector will be produced denoted as $(T_i, \mu_i, \sigma_i, y_i)$, being the usage profile for user i with $T_i$ data points. There are N users to be managed. The notation $\overline{(T,\mu,\sigma,y)}_N$ contains N of these vectors, each representing one user's usage profile.

Figure 4:
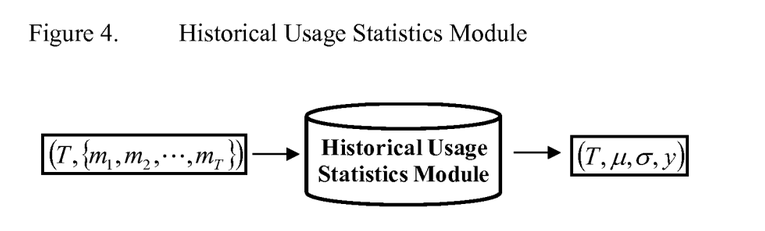
FIG. 4 illustrates a Historical Usage Statistics Module in accordance with at least one aspect of the present invention.

Group A Historical Usage Statistics Module: Use this module only when T≥Threshold, where T is the number of months in which usage data is available. The value of Threshold is a user input control parameter. In a preferred embodiment, we suggest using the value of 6. FIG. 4 shows a schematic representation. Given T numbers: $\{m_1, m_2, \ldots, m_T\}$, with $m_j$ being the minute usage in month j, compute the average $\mu$ and standard deviation $\sigma$ of these numbers as follows:

$$\mu = \frac{1}{T}\sum_{j=1}^{T} m_j, \sigma = \sqrt{\frac{T}{T-1}(y - \mu^2)}, \text{ where } y = \frac{1}{T}\sum_{j=1}^{T} m_j^2.$$

Figure 5:
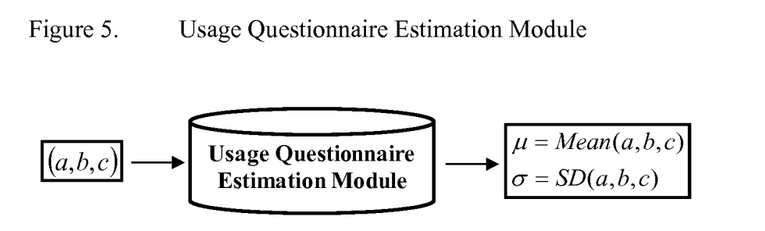
FIG. 5 illustrates a Usage Questionnaire Estimation Module in accordance with at least one aspect of the present invention.

Group B Usage Questionnaire Estimation Module. A new (or almost new, with less than the indicated threshold number of monthly usage data points) user does not have a history of minute usage, therefore an estimation is needed to initialize the process. Use the questionnaire answers as inputs, the system estimates her/his usage statistics. The three requested quantities are: the estimated minimum monthly peak minute usage being a; the estimated monthly peak minute usage being b; the estimated maximum monthly peak minute usage being c. Make sure to check that $0 \leq a \leq b \leq c$.

We also initialize T=1, as minimum historical data for this user. This user's usage statistics are:

$$\mu = \text{Mean}(a, b, c) = \frac{a+b+c}{3},$$

$$\sigma = SD(a, b, c) = \sqrt{\frac{(b-a)^2 + (b-c)^2 + (c-a)^2}{36}},$$

$$y = (\text{Mean}(a, b, c))^2 + (SD(a, b, c))^2.$$

FIG. 5 shows a schematic.

Figure 6:
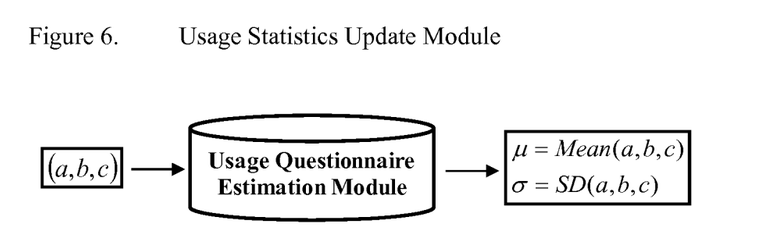
FIG. 6 illustrates a Usage Statistics Update Module in accordance with at least one aspect of the present invention.

Usage Statistics Update Module: given a historical usage statistics vector ($\mu$, $\sigma$, y) and a current month usage m, this module updates to provide a new usage statistics vector ($\mu$, $\sigma$, y). When T<Threshold−1. $\mu \to \mu$, $\sigma \to \sigma$, T→T+1. When T=Threshold−1, use the Initial Usage Statistics Module to compute an initial set of parameters (T, $\mu$, $\sigma$, y). After this update T will equal exactly Threshold.

$$\mu \to \frac{1}{T+1}(T\mu + m), y \to \frac{1}{T+1}(Ty + m^2),$$

$$\sigma \to \sqrt{\frac{T+1}{T}(y - \mu^2)}, T \to T+1.$$

FIG. 6 shows the schematic of this module.

Figure 7:
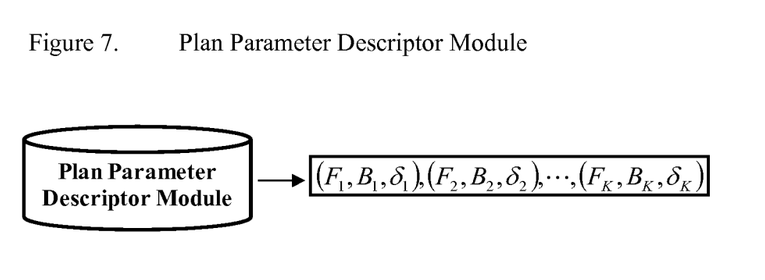
FIG. 7 illustrates a Plan Parameter Descriptor Module in accordance with at least one aspect of the present invention.

Plan Parameters Descriptor Module: This module takes inventory of available subscription plans offered by the carrier under analysis. Each plan is characterized by the following plan parameters ($F_j$, $B_j$, $\delta_j$) for plan j, these parameters respectively being the fixed monthly recurring charge $F_j$ (MRC), minute allowance $B_j$ and per minute overage rate $\delta_j$. This module makes available all the plans that can be chosen by each user. There are a total of K plans. FIG. 7 shows the schematic.

Figure 8:
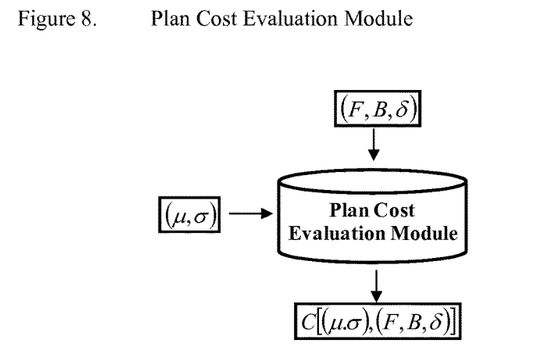
FIG. 8 illustrates a Plan Cost Evaluation Module in accordance with at least one aspect of the present invention.

Plan Cost Evaluation Module: Given a usage pattern ($\mu$, $\sigma$), being the mean and standard deviation of a usage profile, and a plan description with parameter set (F, B, $\delta$), this module computes the average cost for the input usage pattern if subscribed to the input plan. In one embodiment of the system, we compute C, the average monthly cost if usage pattern ($\mu$, $\sigma$) subscribes to plan (F, B, $\delta$) as follows assuming a normal distribution of a user profile with the input mean and standard deviation values. FIG. 8 shows the schematic.

$$C[(\mu, \sigma), (F, B, \delta)] = F + \frac{\delta\sigma}{\sqrt{2\pi}}e^{-0.5\left(\frac{B-\mu}{\sigma}\right)^2} + \delta(\mu - B)\left[1 - \Phi\left(\frac{B-\mu}{\sigma}\right)\right].$$

$$\Phi(t) = \frac{1}{\sqrt{2\pi}}\int_{x=-\infty}^{t} e^{-0.5x^2}dx.$$

A different embodiment uses a triangular (three point) distribution, while a third embodiment uses a Beta Distribution.

The modeled objective provides the expected cost evaluation matching available plans to usage profile (being modeled by a probability distribution, with three being used as examples herein). This expected cost takes into account overage charge (when usage exceeds plan allowance) and wasted minutes (when usage remains below the allowance), which is the correct measure when expenses are recurring month after month.

Figure 9:
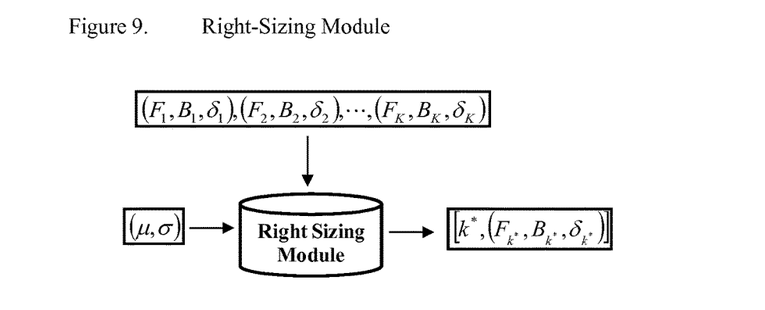
FIG. 9 illustrates a Right-Sizing Module in accordance with at least one aspect of the present invention.

Right-Sizing Module (or a Benchmark Module): Given a usage pattern ($\mu$, $\sigma$) and K plan choices, each plan being associated with its own plan specific parameter set ($F_j$, $B_j$, $\delta_j$), this module returns the least average cost plan for this user. We use the Plan Cost Evaluation Module to compute: $MRC_j = C[(\mu,\sigma),(F_j, B_j, \delta_j)]$. Select the plan with the minimum $MRC_j$, and identify this plan as k*:

$$MRC_{k^*} = \min_{j=1,2,\ldots,K}\{MRC_j\}.$$

The Right Sizing Module will return the minimum cost plan identity together with its plan parameter set for each user. FIG. 9 shows the schematic. This module will be used as a baseline cost for individual user, to be used in the Chargeback Module to allocate the cost of a shared pool to corporate cost centers.

Figure 10:
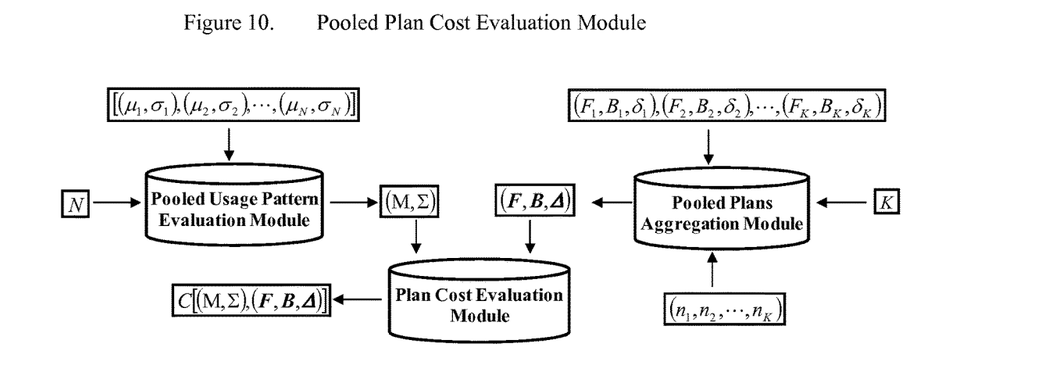
FIG. 10 illustrates an Expanded Plan Cost Evaluation Module in accordance with at least one aspect of the present invention.

Pooled Plan Evaluation Module: In order to provide optimal pooling packages for a group of N users to share a common pool of minutes, one has to aggregate the usage profiles of all the users into a pooled usage profile; and to aggregate the subscription plans into a pool plan parameters. This module uses the following other modules to evaluate the average monthly cost for N users when $n_j$ of plan j are included in the pool with the requirement that a total of N plans are collectively subscribed to. FIG. 10 shows the logic of this module, with three sub-modules: Pooled Usage Pattern Evaluation Module, Pooled Plan Aggregation Module and Plan Cost Evaluation Module. The output of this module is the average monthly cost for these N users.

Figure 11:
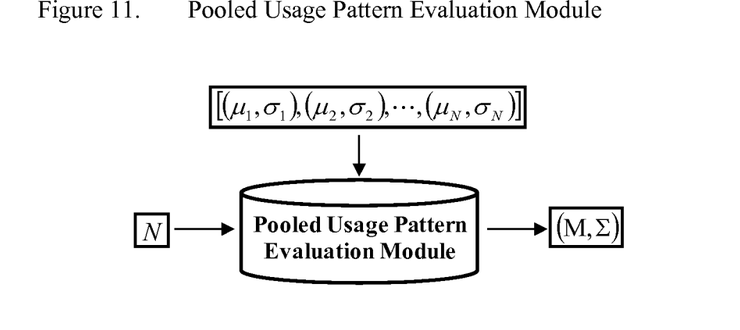
FIG. 11 illustrates a Pooled Usage Pattern Evaluation Module in accordance with at least one aspect of the present invention.

Pooled Usage Pattern Aggregation Module: Given N users, each with usage pattern statistics ($\mu_i$, $\sigma_i$), i=1, 2, . . . , N, this module computes the aggregated usage pattern statistics for these N users. $M=\Sigma_{i=1}^{N}\mu_i, \Sigma\sqrt{\Sigma_{i=1}^{N}\sigma_i^2}$. FIG. 11 shows the schematic.

Figure 12:
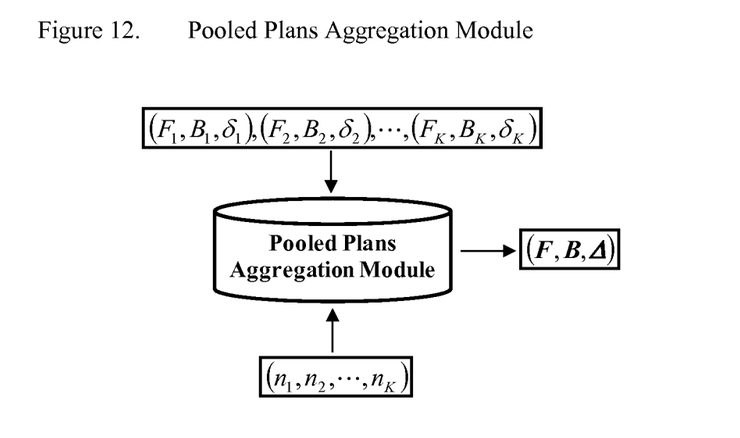
FIG. 12 illustrates a Pooled Plans Aggregation Module in accordance with at least one aspect of the present invention.

Pooled Plan Aggregation Module: Given K available plans with their respective plan parameter set ($F_j$, $B_j$, $\delta_j$), j=1, 2, K and K non-negative integers $n_j$, which sum to N: $\Sigma_{j=1}^{K}n_j=N$, $n_j \geq 0$ and integers, this module aggregates these N plans into a single pooled plan with $n_j$ being the number of plan j to be included in the aggregation. Note that when $n_j=0$, there will be no plan j in the pool.

$$F = \sum_{j=1}^{K} n_j F_j, B = \sum_{j=1}^{K} n_j B_j, \Delta = \sum_{j=1}^{K} \frac{n_j \delta_j}{N}.$$

FIG. 12 shows the schematic.

Figure 13:
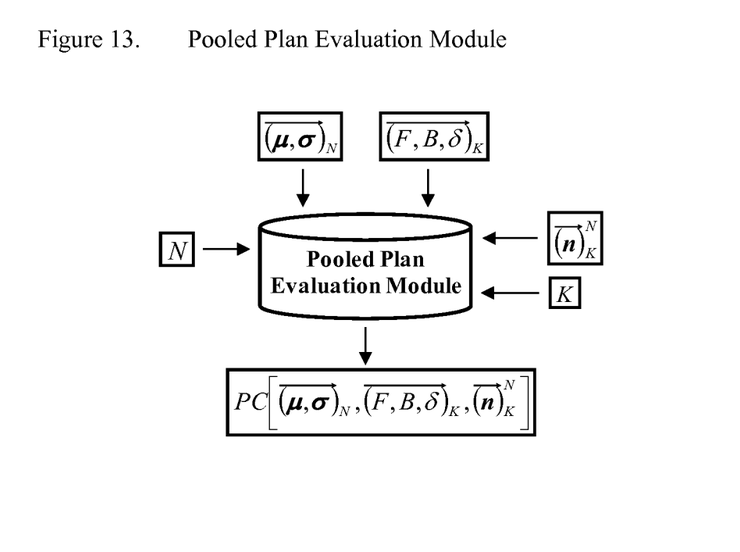
FIG. 13 illustrates a Pooled Plan Evaluation Module in accordance with at least one aspect of the present invention.

To provide a compact notation for the Optimal Pooling Module, we will use the following symbols: $\overrightarrow{(\mu,\sigma)}_N$: a vector of usage pattern statistics with N users; $\overrightarrow{(F,B,\sigma)}_K$: a vector of plan parameter sets with K plans; $\vec{(n)}_K^N$: a vector of K non-negative integers that sum to N. Note that the pooled cost, PC, is the average monthly cost for these N users when the pool subscribes to $n_j$ of plan # j. In one embodiment of the system, we compute the pooled cost as follows, using the Plan Cost Evaluation Module as in [0077] and FIG. 8: PC[$\vec{(\mu,\sigma)}_N, \vec{(F,B,\delta)}_K, \vec{(n)}_K^N$]=C[(M,Σ),(F, B, Δ)]. FIG. 13 shows the schematic of this Pooled Plan Cost Evaluation Module with this compact notation.

It is theoretically accurate to use the formula depicted in [0077] to represent the expected cost of the shared pool with the collective usage being modeled by a normal distribution as a consequence of a form of Central Limit Theorem.

Figure 14:
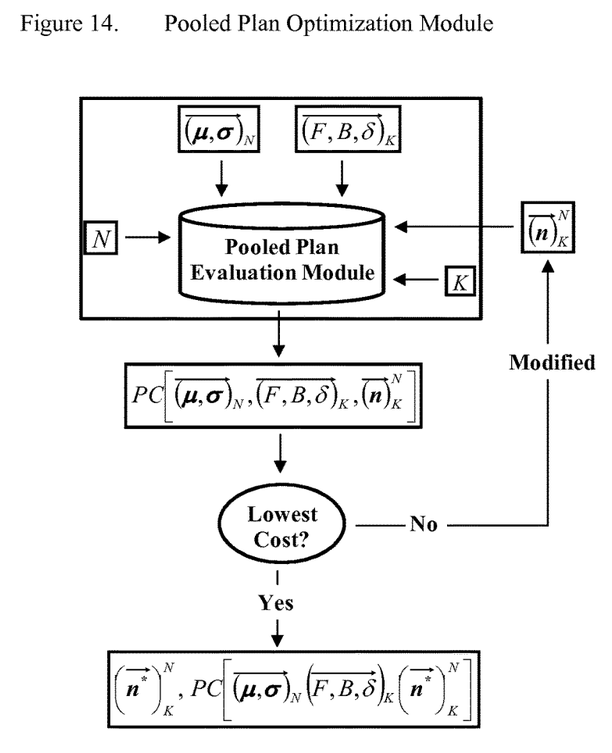
FIG. 14 illustrates a Pooled Plan Optimization Module in accordance with at least one aspect of the present invention.

Optimal Pooling Module: Optimal Pooling means that all users in the pool will share a common pool of minutes (B), for a MRC of F and an overage per minute rate of Δ. This module uses the Pooled Plan Evaluation Module by finding the subscription vector $\vec{(n)}_K^N$ such that the pooled cost PC is minimized. The outputs of this module are: $\vec{(n^*)}_K^N$: the optimal subscription plans which minimizes the average (total) pooled cost computed as PC[$\vec{(\mu,\sigma)}_N, \vec{(F,B,\delta)}_K, \vec{(n^*)}_K^N$]: the optimal minimized pooled cost value, using the optimal subscription plans $\vec{(n^*)}_K^N$. FIG. 14 shows the schematic. Note that an additional feature fee may be charged by the carriers for the privilege allowing pool users to share a pool of minutes.

Figure 15:
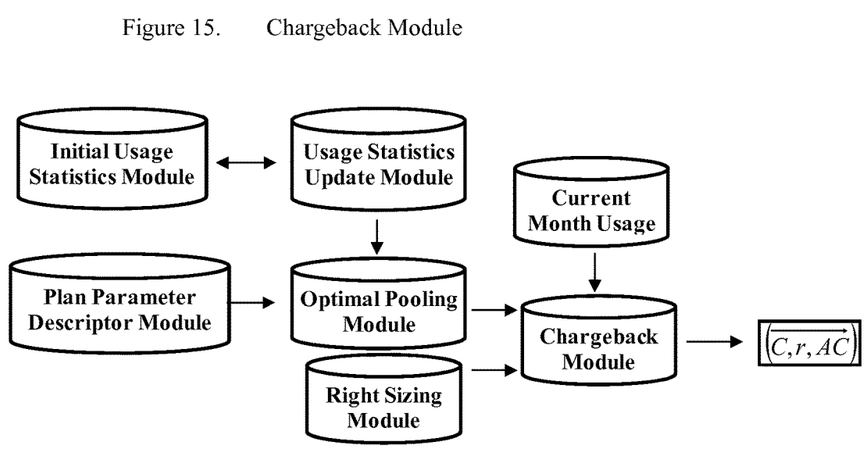
FIG. 15 illustrates a Chargeback Module in accordance with at least one aspect of the present invention.

Chargeback Module: The Right Sizing Module provides a benchmark/baseline for each user: what it the least average cost plan they can subscribe on their own? Each user will be charged for that monthly amount based on actual usage and their artificially assigned optimal subscription plan as a baseline. The sum of all baseline charges will be higher than the actual amount paid to the carrier under optimal pooling in which pool minutes are shared. The savings will be distributed to each user in some fashion. One embodiment of implementation is to distribute the savings proportional to each user's baseline spend. This chargeback scheme is incentive compatible because a user is better off in the optimal pooling arrangement than they could have achieved had they gone on their own. Note that this chargeback is calculated only for peak minute usage. Other charges (such as individual equipment charges, out-of-network roaming, international long distance, etc.) are to be billed in additional to the chargeback computed here.

The mathematics and chargeback process scheme is described herein. A user will be able to see her/his savings (denoted pooling credit) as a result of pooling. The following formula shows one embodiment of this incentive compatible chargeback scheme. $\vec{(n^*)}_K^N$ is a vector representing the optimal number of plans for each plan type to be included in the optimal pool, output from the Optimal Pooling Module. N is number of users in the pool. i* is the optimal Plan for user i, from the Right Sizing Module. $u_i$ is the current month (actual) peak minute usage by user i. $C_i = F_{i^*} + \max\{0, \delta_{i^*}(u_i - B_{i^*})\} + \text{Tax}_* + \text{Fee}$ is the (artificial baseline) amount charged to user i based on the optimal plan from the Right Sizing Module, including taxes and fees. TV$ is the total voice (peak minute) cost for the pool, including pooling feature fee (e.g., $5 per user) with taxes and fees. The total Pool Saving $$PS = TV\$ - \sum_{k=1}^{N} C_k \cdot r_i = PS \frac{C_i}{\sum_{k=1}^{N} C_k}$$

is the pooling rebate (or credit) due user i. $AC_i = C_i - r_i$ is the actual charge due to peak minute usage for user i. FIG. 15 contains a schematic for this embodiment of the Chargeback Module.

Another embodiment to be used in the Chargeback Module is to allocate the Pool Saving to individual user proportional to actual monthly minute usage.

Individualized Billing Module: This module generates individualized bills for each corporate user, reflecting the results of optimized pooling and containing the Pooled Plan MRC, adjusted taxes and chargebacks, instead of the plans actually subscribed with the carrier. Additional usage and recurring charges that do not affect pooling are retained and carried over from the original carrier bill.

Account Maintenance: In one embodiment of the system, account maintenance has two different cycles: monthly and periodic. Monthly maintenance, in one embodiment, creates exception reports to each user, when appropriate and it also provides tracking reports to corporate manager. Periodic maintenance, in one embodiment, continuously monitors the system to update pooling plans when appropriate.

Monthly User Report Module: The system allows the selection of sensitivity parameters to send automatic report to individual user alerting unusual activities. Report recipient can go to a web-based portal to respond. One embodiment of the system monitors unusually high or low usage: if usage is outside of some specified range, an unusual usage report will be sent to a user. The embodiment by way of an example will work as follows: a range will be set to be (α, β), where upper=$\mu+\alpha\sigma$, lower=$\max(0,\mu-\beta\sigma)$; (μ, σ) is the average and standard deviation pair of monthly peak usage associated with this user, output from the Usage Statistics Update Module. The parameters α and β are controlled by system inputs, which measure the number of standard deviation away from the average; as one embodiment of the monitoring sensitivity process. In another embodiment, the following expenses will be monitored: roaming (out of the primary carrier's network), international long distance, data usage charge, and others as specified by system administrator. A limit on each type of charges will be set, above which exception notification will be sent.

Monthly Usage Tracking Module: Usage statistics for all users will be tracked to show monthly trend. As one embodiment of the system, the following statistics will be computed and tracked graphically and presented to the corporate manager: total number of users, number of users exiting the system, number of new users, total number of peak minute usage, equipment spend, total number of peak voice minutes used, total number of overage (above the pooled minutes), total number of wasted minutes (below the pooled allowance), note that one of the two numbers will be zero (overage and wasted), cost per peak minute used, maximum peak minute usage by a user, minimum peak minute usage by a user, number of inactive accounts (with zero usage)

Figure 16:
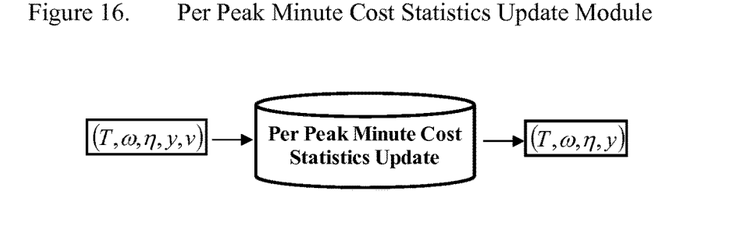
FIG. 16 shows the Per Peak Minute Cost Statistics Update Module in accordance with at least one aspect of the present invention.

Re-optimization Module: Because of entrance of new users and exit of current users, the aggregate usage pattern may change over time—requiring new optimized plan subscriptions. In one embodiment to trigger re-optimization, the system uses the per peak minute cost as a metric to monitor system performance. The per peak minute cost will be tracked with its moving average and standard deviation being continuously monitored. After a re-optimization reset, the system will be fine-tuned in subsequent months to ensure continuing savings. After six months of operations (as a particular example and a particular embodiment of the system), the average per peak minute cost will be updated as well as the standard deviation of the per peak minute cost. No action is taken in the first (user input) x months, and we will use four months as an example. Denote $v_t$ as the per peak minute cost in month t, the system first computes the mean $\omega$ and standard deviation $\eta$ of $$\{v_1, v_2, v_3, v_4\}: \omega = \frac{1}{4}\sum_{t=1}^{4} v_t, y = \frac{1}{4}\sum_{t=1}^{4} v_t^2, \eta = \sqrt{y - \omega^2}.$$

At month T>4, the following updating will be performed where v is the per peak minute cost in the current month:

$$\omega \to \frac{1}{T}(T\omega + v), y \to \frac{1}{T}(Ty + v^2), \eta \to \sqrt{(y - \omega^2)}, T \to T + 1.$$

FIG. 16 shows the Per-Peak-Minute Cost Statistics Update Module. If the current month's per peak minute cost is above a system-prescribed level, the Optimal Pooling Module will be activated to obtain a new set of optimal subscriptions. As one embodiment of implementation, the system prescribes $U=\omega+\kappa\eta$ as the triggered level for the current Per-Peak-Minute Cost, over which a re-optimization will be carried out: when the current month's per peak minute cost is above $\kappa$ of the standard deviation of its (historical) average of the pool's per peak minute cost.

Figure 17:
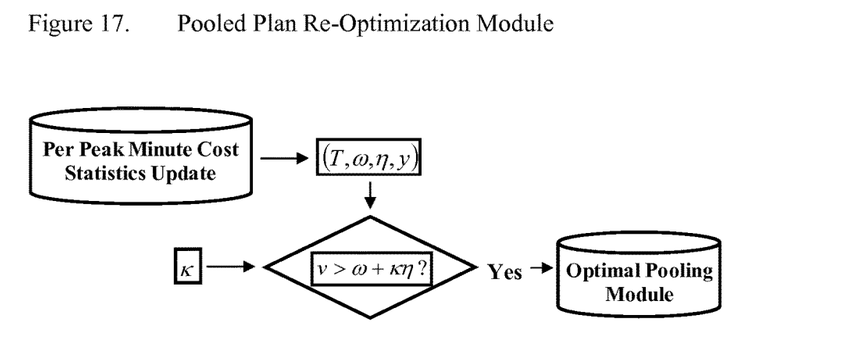
FIG. 17 illustrates a Pooled Plan re-Optimization Module in accordance with at least one aspect of the present invention.

FIG. 17 shows a schematic of this particular embodiment of the Re-optimization Module.

Figure 18:
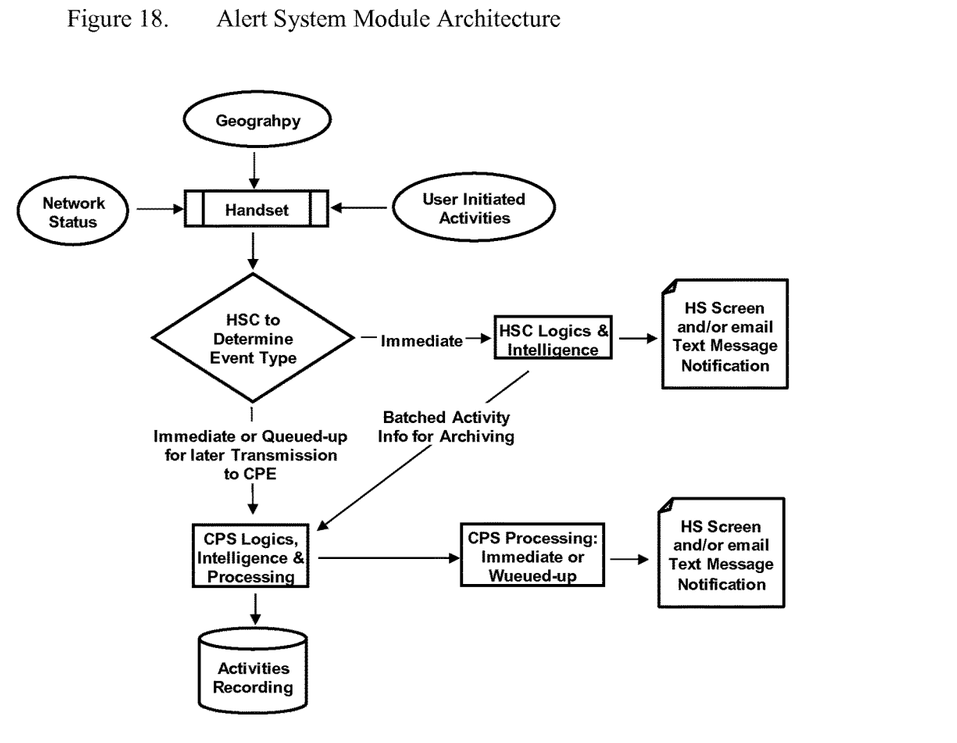
Figure 19:
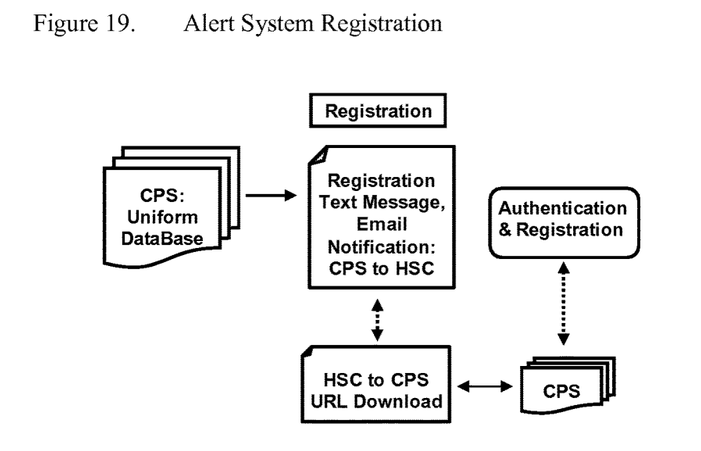
FIG. 19 illustrates the Alert System Registration Module in accordance with at least one aspect of the present invention.

The Alert System Module: FIG. 18 shows the logical flow of this module with its operational and information exchanges between the HandSet Client, HSC and the Central Processing Server, CPS.

A HSC includes but is not limited to a Blackberry, an Android, or an i-Phone.

A CPS can operate on the Internet Cloud utilizing Cloud Computing Provision (one such embodiment is to use the Amazon Cloud); or as another embodiment, a CPS can operate as a managed server connected to the Internet. Another embodiment is to house the CPS in a corporation's data center.

All communications between the CPS and HSC will be encrypted to provide system security.

Figure 20:
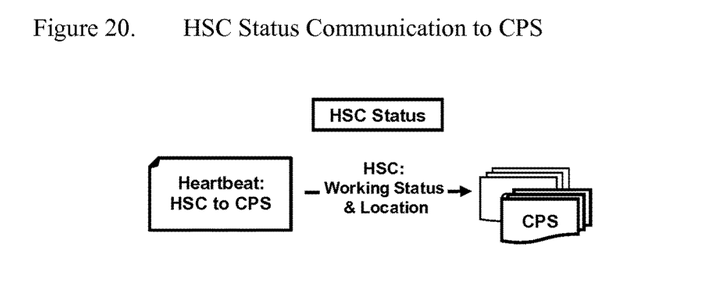
FIG. 20 illustrates a schematic showing HSC Status Communications to the CPS, in accordance with at least one aspect of the invention.

One embodiment of the initiation process is for the CPS to deliver download instructions, via an email or text message, to each HSC for system download from a secured URL site, performing authentication and registration functions. FIG. 20 shows the schematics.

Each registration is associated with a unique telephone number. A registration request for URL application download is authenticated against authorized user list at CPS at which point a HSC (with its unique identification, phone number, SIM ID) will be placed in the "green zone" of alert user list.

A registered (with the CPS) HSC will communicate with the CPS over-the-air via at least one medium. Example media include: a carrier's cellular network, a WiFi network. The exact medium will be determined by at least one criterion. Example criteria include: least cost, availability.

Over-the-air communicates at least the following set of information from a HSC to the CPS: regular heartbeat (to indicate the HSC is on the "grid", i.e., operating properly), periodic location information (in one embodiment, it will be the Network ID; while another embodiment will be a GPS location), periodic cumulative usage (both data and voice) information.

Figure 21:
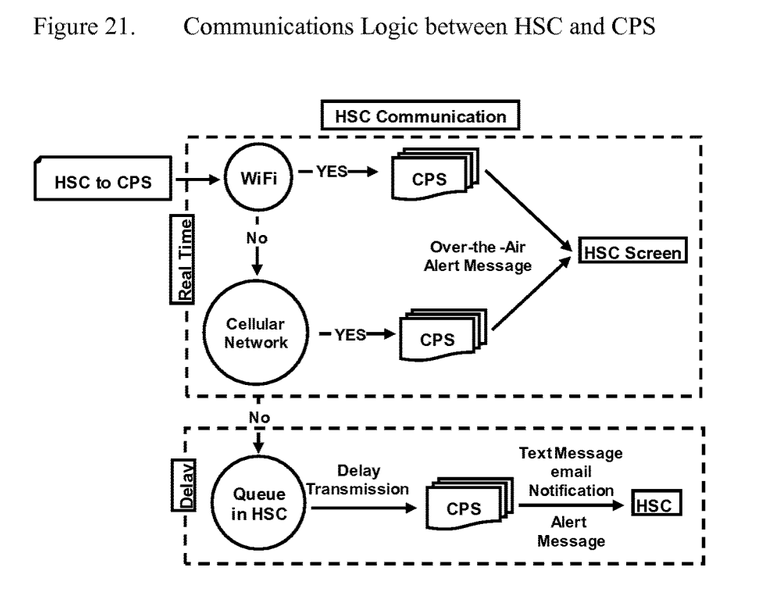
FIG. 21 shows the Communication Logics between a HSC and the CPS, in accordance with at least one aspect of the present invention.

When over-the-airwave communication (either WiFi or cellular network) is not available, some or all intended information will be queued at the HSC. FIG. 21 shows a particular logical sequence to forward or store information from a HSC to the CPS.

A particular embodiment to implement the communication logic for delayed messages is depicted in FIG. 21. The HSC will attempt transmission of queued information every x minutes (or any unit of time) with x being defined by system administrator.

Figure 22:
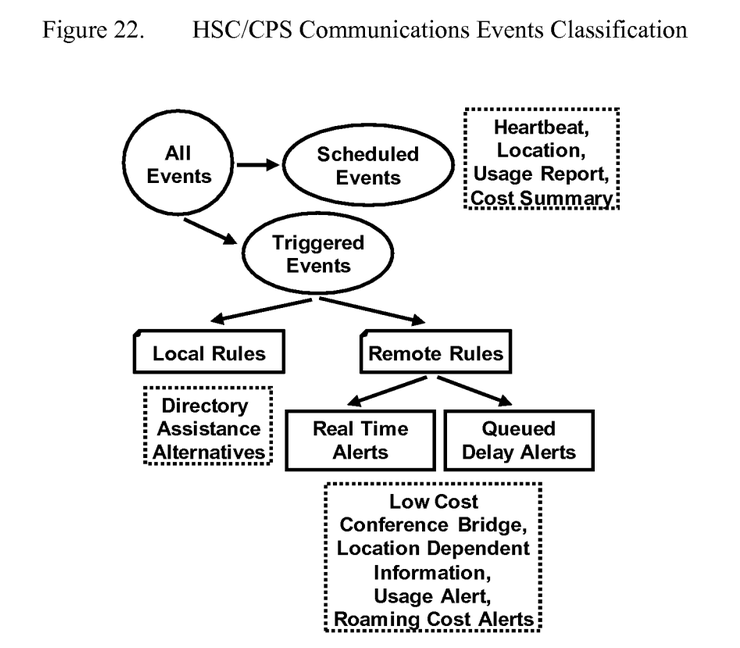
FIG. 22 illustrates the classification of HSC/CPS Communications Events, in accordance with at least one aspect of the present invention.

An alert message will be triggered by certain well defined events, either locally from the HSC or sent from the CPS to a HSC. These events are further defined as real-time triggered events, or scheduled events. FIG. 22 shows the classification.

One embodiment of alert messages is triggered by real-time local (logical) rules, which reside in the HSC. One example of local rules is directory assistance calls. When a user dials an expensive directory assistance call (e.g., 411 in the U.S.), an alert message will appear on the HSC screen to provide a low/no cost alternative (e.g., 1-800-GOOG-411). FIG. 22 shows the schematic.

Another embodiment of alert messages is triggered by rules residing on the HSC and updated by the CPS anytime a user enters a new country. FIG. 22 shows the schematic.

An example of a by-country remote rule (enforced at the HSC): a user in the U.S. dials a corporate 1-800-COMPANY toll free number using a smart phone. The dialed information will be checked against a list of phone numbers against 1-800-COMPANY as well as the location of the HSC. If certain logical (and/or) criteria are met, an alert message will be displayed on the screen upon the completion of the call, in two parts, comprising:

Message one: "Please use the Corporate local number 1-415-COMPANY".

Message two: "Store 1-415-COMPANY in Address Book with entry name SF Conference Bridge Number. Press the ENTER key".

As another example of alert message generated from scheduled triggered events. A heartbeat (indicating this HSC is on the "grid") is sent to the CPS every y hours, with y to be determined by the system administrator. When the CPS fails to receive a heartbeat message for an extended period of time (a parameter to be defined by the system administrator), an email and/or text message will be sent to the registered user to inquire and to verify: for examples, when the HSC is turned off, lost, stolen or for any other reasons.

Figure 23:
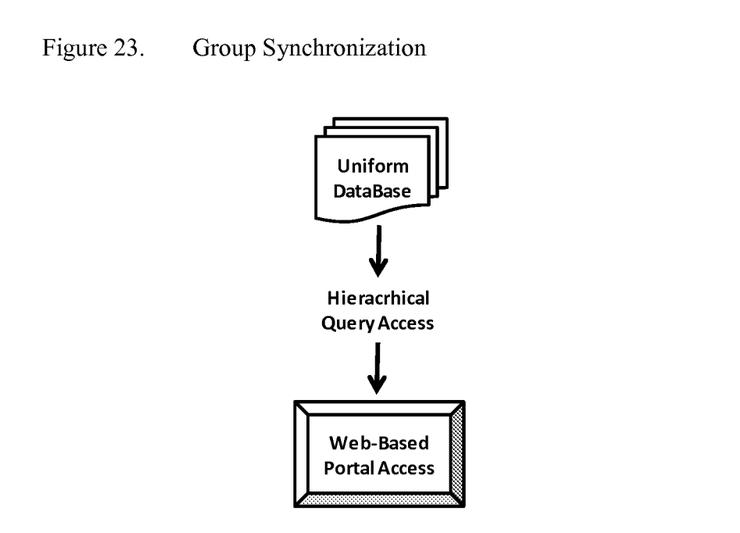
FIG. 23 is a schematic showing Group Synchronization of HSC groups, in accordance with at least one aspect of the present invention.
Figure 24:
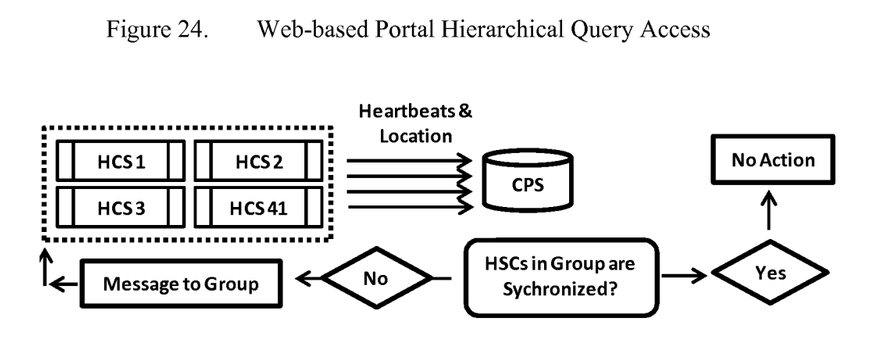
FIG. 24 shows a schematic depicting the Web-based Portal Hierarchical Query Access Module.

Another example of alert message generated from scheduled triggered events is as follows. Several HSCs travel in group (e.g., truck-roll installation, utility workers), which will be registered with CPS as a travel group to be configured on an as-needed basis. Periodic heartbeat and location information will be constantly monitored by the CPS. When a particular HSC (or a subset of the group) is not in sync with the rest of the group, a message will be sent to members of the group to alert: "HSC 2 is wayward from the group". This function prevents loss and misplacement of hardware. FIG. 23 shows the schematic.

Other alert messages are triggered by cumulative usage information stored in a HSC. The following are some examples.

International long distance expense: "You have been making many international long distance calls, we recommend that you should subscribe to an international dialing plan".

Excessive roaming calls: "You have been making many roaming calls in Germany, exceeding more than y minutes a month. We recommend that you should subscribe to an international roaming plan".

Excessive Data usage alert: "Just want to alert you that your data usage has exceeded 2 GB of download in the last two weeks".

SMS usage alert: "Just want to alert you that your SMS usage is 2 times your usual average in the last two weeks".

The Alert System module also monitors certain operating statistics of the HSC. These monitoring functions, to be communicated to the CPS over-the-air from each HSC, include, but are not limited to, End-of-Day cumulative statistics (examples being: daily outgoing SMS counts, daily in-out data usage.).

Each HSC also marks and classifies HSC activities, to be communicated to the CPS. These classifications include, but are not limited to, whether a dialed number is international or national, whether a dialed call is in-network or out-of-network. The communication frequency from each HSC to the CPS is defined by system administrator.

The Web-based Portal Hierarchical Access Module allows restricted and well-defined allowed/certified access of system users by classification. An individual user will have information access relevant to its account, while managers of different authority classification will have access to accounts relevant to a manager's function.

Report Generation provides information representation of various kinds useful to a system user. Such information/reports/charts/graphs include, but are not limited to, historical usage profile defined by a time window, summary usage statistics defined by a user, exception report to identify defined triggered events. Embodiment of such triggered events include, but are not limited to, top voice user(s) in a group, top data user(s) in a group, monthly usage exceeding a defined threshold, dormant accounts, usage trends, and any other reports defined by a database query.

The Uniform Database Module "normalizes" data from various vendors, service providers and other sources. Monthly Statements, Call Detail Records (CDRs), invoices and all billing information, plan data (including, but not limited to, limits, rates, discounts), usage summaries, etc. are extracted from various sources, transformed into a single consistent and uniform data model and loaded into the database. This Uniform Database is then processed and used by the invention to perform its functions.

The invention claimed is:

1. A system for providing an integrated total mobile device communication cost and usage management, the system comprising the following:
   (i) a computer program residing on a non-transitory computer readable medium and connected to the server (Central Processing Server, CPS), the computer program thereon connecting to the Uniform Database, which creates a database containing an optimal pool of minutes and data units to be shared by a group of users;
   (ii) a computer program module connecting to the Uniform Database and the CPS generates an equitable common cost distribution/allocation (to end users) process which is achieved through an incentive compatible chargeback mechanism: an individual user is cost-wise better off in the shared environment compared against the best stand-alone subscription option chosen from all available usage plans;
   (iii) a computer program residing on a mobile device (Handset Client—USC) and connecting to the server and the program residing on the CPS to provide an active real-time alert system to monitor usage, to provide real-time least cost options, alerted events include, but not limited to during roaming and international travel;
   (iv) a uniform database platform pulling relevant billing statements and invoicing information from a multitude of vendors and platforms a bill database stored on the non-transitory storage device and accessed by the server, the bill database having stored thereon bill data from multiple telecommunication carriers and platforms, normalized to a Uniform Database;
   (v) a human user interface provided by a computer program residing on the server, generating intelligent customized reports and individual billing with hierarchically defined user access.

2. The system according to claim 1, wherein a module connected to the server which allows a plurality of users subscribe to at least one of the several available vendors with one vendor-specific service plan, contracted to receive voice and/or data service.

3. The system according to claim 1, wherein there is one or more subscription plan(s), and any number of service providers.

4. The system according to claim 1, wherein the probabilistic usage of telecommunication units (voice and/or data) is represented by at least one probability model (where the following usage pattern/profile models are used as illustration of the system: triangular, beta and normal usage pattern/profile models) in which several critical statistics (such as average, standard deviation) are captured and used in the system.

5. The system according to claim 1, wherein a module connected to the server generates the estimates of usage parameters based on both historical usage pattern and questionnaire input and stores this data in the Uniform Database.

6. The system according to claim 1, wherein a module connected to the server continuously updates continuously updates usage parameters in the Usage Database based on aggregated historical statistics and current usage.

7. The system according to claim 1, wherein a module connected to the server evaluates and represents long term cost based on one of the following usage probability distribution models: triangular, beta and normal.

8. A method of optimizing pooled plan subscriptions is established wherein users will share a common pool of voice minutes, comprising:
   (ii) a computer program residing on a non-transitory computer readable medium and attached to the server, wherein the computer program aggregates usage patterns of many users, based on and as an application of a form of Central Limit Theorem and stores the results in the Uniform Database;
   (ii) a module attached to the computer program and residing on a non-transitory computer readable medium attached to the server, wherein the computer program method aggregates plan parameters when more than one plan is aggregated into a common pool;
   (iii) a module attached to the computer program which resides on a non-transitory computer readable medium in the server to analytically compute the average cost for the group of users who share a common pool of minutes, as a novel application and based on a well-grounded result using a form of Central Limit Theorem and storing the result in the Uniform Database;

(iv) a module residing on a non-transitory computer readable medium attached to the computer program that applies a specific analytical procedure to optimize subscription plans to determine how many and what types of plans will be purchased for the user pool.

9. The system according to claim 1, wherein a baseline is established for each user as a stand-alone unit, herein referred to as right-sizing or baseline, comprising of:

(i) a module residing on a non-transitory computer readable medium attached to the computer program which analytically computes the average monthly cost of a user based on its probabilistic usage profile and uses a particular probability model (chosen from the following well tested distributions: triangular, beta or normal distribution usage pattern/profile) incorporating the average usage and the standard deviation of us e evaluated against each available plan one at a time;

(ii) at least one method to establish the average monthly cost of a user based on its probabilistic usage profile based on a particular probability model incorporating at least the average usage and the standard deviation of usage;

(iii) a module residing on a non-transitory computer readable medium attached to the computer program which selects a least-cost plan chosen from all available plans for each user characterized by its statistical usage profile as implied by the chosen probability model to establish a baseline.

10. The system according to claim 1, wherein a chargeback scheme is created comprising:

(i) a method to right-size each user by selecting the best stand-alone subscription plan to establish a baseline;

(ii) a module residing on a non-transitory computer readable medium attached to the computer program which analytically allocate monthly cost to each user according to its right-sized plan (the baseline) and actual usage with credit distributed from the difference between invoice and the collective charge from baseline benchmark of each user's right-sized plan.

11. The system according to claim 1, wherein a pooled plan re-optimization module is established, comprising:

(i) a module residing on a non-transitory computer readable medium attached to the computer program which analytically updates the average usage and the standard deviation of usage when new usage information becomes available;

(ii) a module residing on a non-transitory computer readable medium attached to the computer program containing a method to establish and to monitor usage trends to determine a threshold for re-optimization;

(iii) a module residing on a non-transitory computer readable medium attached to the computer program containing a method to trigger re-optimization of plan subscription.

12. The system according to claim 1, wherein an Alert system is created.

13. The system according to claim 12, wherein a registration procedure is established to activate a HSC.

14. The system according to claim 12, wherein an active real-time alert message is displayed on the HSC when triggered by at least one type of events, listed as follows:

(i) dialing events when a dialed number belongs to a list of established restricted numbers;

(ii) dialing events when an alternative dialing option at a lower cost is available;

(iii) cumulative usage events when cumulative usage of at least one type exceeds a system defined threshold;

(iv) location events when USC location matches certain established system defined criteria;

(v) composite events when dialed event, location event and cumulative usage event collectively meet certain established system defined criteria.

15. The system according to claim 12, wherein an active real-time alert procedure is activated by at least one type of rules; comprising:

(i) local rules wherein alert message is triggered by rules residing on software delivered in the registration process;

(ii) remote rules wherein triggered events information is transmitted from a HSC to the CPS where the alert logic is tested and executed;

(iii) delayed message wherein data network is not available and a triggered event is stored in the HSC to be transmitted to the CPS at a later time; Such delayed responses, once received at the CPS, will be sent via email or text message from the CPS to the HSC.

16. The system according to claim 12, wherein an active real-time alert message is sent to the HSC screen to minimize hardware losses and to facilitate timely hardware recovery.

17. The system according to claim 16, wherein an active real-time alert message is sent to the HSC screen when the HSCs in a defined group are geographically separated as detected by the composite heartbeat/networkID/GPS information.

* * * * *